United States Patent
Zhang

(10) Patent No.: US 10,818,224 B2
(45) Date of Patent: Oct. 27, 2020

(54) APPARATUS AND METHOD FOR DETERMINING AMBIENT LIGHT LUMINANCE, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Yuan Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 12 days.

(21) Appl. No.: 16/389,321

(22) Filed: Apr. 19, 2019

(65) Prior Publication Data

US 2020/0105189 A1 Apr. 2, 2020

(30) Foreign Application Priority Data

Sep. 27, 2018 (CN) .......................... 2018 1 1133558

(51) Int. Cl.
*G09G 3/3225* (2016.01)

(52) U.S. Cl.
CPC ... *G09G 3/3225* (2013.01); *G09G 2320/0626* (2013.01)

(58) Field of Classification Search
CPC ......... G09G 3/3225; G09G 2320/0626; G09G 2360/144
See application file for complete search history.

(56) References Cited

U.S. PATENT DOCUMENTS

| 2013/0076712 A1* | 3/2013 | Zheng | ................... G06F 3/0412 |
| | | | 345/207 |
| 2014/0132158 A1* | 5/2014 | Land | ........................ G09G 3/20 |
| | | | 315/152 |

(Continued)

FOREIGN PATENT DOCUMENTS

| CN | 103033262 A | 4/2013 |
| CN | 103280181 A | 9/2013 |

(Continued)

OTHER PUBLICATIONS

First office action of Chinese application No. 201811133558.1 dated Nov. 15, 2019.

*Primary Examiner* — Michael Pervan
(74) *Attorney, Agent, or Firm* — Syncoda LLC; Feng Ma

(57) ABSTRACT

An apparatus configured to determine ambient light luminance includes: m luminance sensors, m groups of inverse controllers and a processor, wherein the inverse controllers are configured to control luminance of first pixels in n rows of pixels in a display screen, the n rows of pixels including m groups of target pixel rows, each group of the target pixel rows including the first pixels, the first pixel in an $i^{th}$ group of target pixels rows being a pixel located above an $i^{th}$ luminance sensor; the first pixels in the $i^{th}$ group of target pixel rows are correspondingly coupled to an $i^{th}$ group of inverse controllers, and the processor is coupled to the m groups of inverse controller and the m luminance sensors, wherein m is less than or equal to n, and i is a positive integer.

20 Claims, 8 Drawing Sheets

(56) References Cited

U.S. PATENT DOCUMENTS

2014/0132578 A1* 5/2014 Zheng .................. G01J 1/4228
345/207
2018/0274974 A1* 9/2018 Wang ........................ G01J 1/44
2019/0353520 A1* 11/2019 Li .......................... H04M 1/0266
2020/0105183 A1* 4/2020 Dodson ................ G09G 3/2092

FOREIGN PATENT DOCUMENTS

| CN | 107917755 A | 4/2018 |
| CN | 108182896 A | 6/2018 |

* cited by examiner

APPARATUS AND METHOD FOR DETERMINING AMBIENT LIGHT LUMINANCE, AND NON-TRANSITORY COMPUTER-READABLE STORAGE MEDIUM

CROSS-REFERENCE TO RELATED APPLICATION

This application claims priority to Chinese Patent Application No. 201811133558.1, filed on Sep. 27, 2018, the disclosure of which is incorporated herein by reference in its entirety.

BACKGROUND

Full-screen terminals typically refer to terminals having a screen-to-body ratio approaches 100%. Compared with a traditional terminal having sensors arranged at a forehead part of the terminal, the sensors need to be arranged at other part of the full-screen terminal, such that the display screen occupies a larger area on the front panel.

SUMMARY

The present disclosure relates to the field of electronic technologies, and more particularly, to an apparatus and method for determining ambient light luminance.

According to a first aspect of the present disclosure, there is provided an apparatus for determining ambient light luminance, including: m luminance sensors, m groups of inverse controllers and a processor, wherein the inverse controllers are configured to control luminance of first pixels in n rows of pixels in a display screen, the n rows of pixels comprising m groups of target pixel rows, each group of the target pixel rows comprising the first pixels, the first pixel in an $i^{th}$ group of target pixels rows being a pixel located above an $i^{th}$ luminance sensor; the first pixels in the $i^{th}$ group of target pixel rows are correspondingly connected to an $i^{th}$ group of inverse controllers, and the processor is connected to the m groups of inverse controller and the m luminance sensors respectively, wherein m is less than or equal to n, and i is a positive integer.

In some embodiments, the $i^{th}$ group of target pixel rows includes $k^i$ pixel rows, the $i^{th}$ group of inverse controllers includes $k^i$ inverse controllers, and an $h^{th}$ pixel row in the $k^i$ pixel rows is connected to an $h^{th}$ inverse controller in the $i^{th}$ group of inverse controllers.

In some embodiments, the processor is configured to output a first control signal to the m groups of inverse controllers, wherein the first control signal is used for controlling luminance of the first pixels in the m groups of target pixel rows; the processor is further configured to send first instruction information to the m luminance sensors when a level of the first control signal is a first level, wherein the first instruction information is used for controlling the m luminance sensors to acquire an optical signal transmitting through the display screen, and the first level is used for controlling the first pixels in the m groups of target pixel rows to display as black; and the m luminance sensors are configured to determine an ambient light luminance value based on the optical signal.

In some embodiments, the apparatus further includes: an integrated circuit (IC); wherein the target pixel row further includes a second pixel, wherein the second pixel is a pixel other than the first pixel; and the second pixels in the $i^{th}$ group of target pixel rows are connected to the $i^{th}$ group of inverse controllers and the IC.

In some embodiments, the IC is configured to send second instruction information to the processor at intervals of a predetermined period, wherein the second instruction information is used for requesting the processor to adjust the level of the first control signal output to the m groups of inverse controllers to the first level; wherein the predetermined period includes x duty cycle periods used for displaying one frame of image, the duty cycle period is a signal period of a second control signal, and the second control signal is used for controlling luminance of the display screen.

In some embodiments, the processor is configured to adjust the level of the first control signal output to the m groups of inverse controllers to the first level at intervals of a predetermined time duration; wherein the predetermined time duration is t+T×p, t being used for indicating that a level of a second control signal is the first level and indicating a time duration elapsed when the second control signal moves from a top of the display screen to a first luminance sensor, the m luminance sensors being arranged at intervals from up to down at a lower part of the display screen, T being used for indicating the predetermined period, and p being a positive integer.

In some embodiments, the apparatus further includes: a power source terminal; wherein each of the inverse controllers includes: a first switch module and a second switch module; wherein a control terminal of a $j^{th}$ first switch module is connected to the processor, one connection terminal of the $j^{th}$ first switch module is connected to the power source terminal, and the other connection terminal of the $j^{th}$ first switch module is connected to a $j^{th}$ row of first pixels; and a control terminal of a $j^{th}$ second switch module is connected to the processor, one connection terminal of the $j^{th}$ second switch module is connected to the $j^{th}$ row of first pixels, and the other connection terminal of the $j^{th}$ second switch module is connected to a $j^{th}$ row of second pixels; wherein j is a positive integer.

In some embodiments, the $j^{th}$ first switch module is configured to be turned on when a level of a first control signal is a first level and to send a voltage signal provided by the power source terminal to the $j^{th}$ row of first pixels under control of the first control signal provided by the processor, the voltage signal being at the first level; the $j^{th}$ first switch module is further configured to be turned off when the level of the first control signal is a second level; the $j^{th}$ second switch module is configured to be turned off when the level of the first control signal is the first level; and the $j^{th}$ second switch module is further configured to be turned on when the level of the first control signal is the second level and to send a second control signal to the $j^{th}$ row of first pixels via the $j^{th}$ row of second pixels under control of the first control signal provided by the processor.

In some embodiments, the IC is configured to send the second control signal to the $j^{th}$ row of second pixels when the level of the first control signal is the first level; and the IC is further configured to send the second control signal to the $j^{th}$ row of second pixels when the level of the first control signal is the second level, to enable the $j^{th}$ row of second pixels to send the second control signal to the $j^{th}$ row of first pixels.

In some embodiments, each of the first switch modules includes a first switch transistor, and each of the second switch modules includes a second switch transistor; wherein a gate of a $j^{th}$ first switch transistor is connected to the processor, a source of the $j^{th}$ first switch transistor is connected to the power source terminal, and a drain of the $j^{th}$ first switch transistor is connected to the $j^{th}$ row of first pixels; and a gate of a $j^{th}$ second switch transistor is connected to the processor, a source of the $j^{th}$ second switch transistor is connected to the $j^{th}$ row of second pixels, and a drain of the $j^{th}$ second switch transistor is connected to the $j^{th}$ row of first pixels.

According to a second aspect of the present disclosure, there is provided a display screen, including the apparatus for determining ambient light luminance in the first aspect; wherein luminance sensors in the apparatus for determining ambient light luminance are arranged at a lower part of the display screen.

According to a third aspect of the present disclosure, there is provided a method for determining ambient light luminance, wherein the method is applied to the apparatus for determining ambient light luminance in the first aspect. The method includes: outputting, by a processor, a first control signal to the m groups of inverse controllers, wherein the first control signal is used for controlling luminance of first pixels in m groups of target pixel rows and the first pixels are arranged above the luminance sensors; sending, by the processor, first instruction information to the m luminance sensors when a level of the first control signal is a first level, wherein the first instruction information is used for controlling the m luminance sensors to acquire an optical signal transmitting through the display screen, and the first level is used for controlling the first pixels in the m groups of target pixel rows to display as black; and determining, by the m luminance sensors, an ambient light luminance value based on the optical signal.

In some embodiments, the apparatus for determining ambient light luminance further includes an IC, and the method further includes: sending, by the IC, second instruction information to the processor at intervals of a predetermined period, wherein the second instruction information is used for requesting the processor to adjust the level of the first control signal output to the m groups of inverse controllers to the first level; wherein the predetermined period includes x duty cycle periods used for displaying one frame of image, the duty cycle period is a signal period of a second control signal, and the second control signal is used for controlling luminance of the display screen.

In some embodiments, after sending, by the IC, the second instruction information to the processor at intervals of a predetermined period, the method further includes: adjusting, by the processor, the level of the first control signal output to the m groups of inverse controllers to the first level at intervals of a predetermined time duration; wherein the predetermined time duration is t+T×p, t being used for indicating that a level of the second control signal is the first level and indicating a time duration elapsed when the second control signal moves from a top of the display screen to a first luminance sensor, the m luminance sensors being arranged at intervals from up to down at a lower part of the display screen, T being used for indicating the predetermined period, and p being a positive integer.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the apparatus for determining ambient light luminance is integrated with the mobile phone; in some other embodiments, the apparatus can be a plug-and-play device for the mobile phone, and can access and be controlled by the programs/apps/instructions stored on the phone. In some implementations, the apparatus can draw power from the phone. In some other implementations, the apparatus can have its own battery.

In some embodiments, anon-transitory computer-readable storage medium having stored therein instructions that, when executed by a processor of an apparatus for determining ambient light luminance, cause the apparatus to perform a method for determining ambient light luminance, the method includes: outputting, by the processor, a first control signal to m groups of inverse controllers, wherein the first control signal is used for controlling luminance of first pixels in m groups of target pixel rows and the first pixels are arranged above m luminance sensors; sending, by the processor, first instruction information to the m luminance sensors when a level of the first control signal is a first level, wherein the first instruction information is used for controlling the m luminance sensors to acquire an optical signal transmitting through a display screen, and the first level is used for controlling the first pixels in the m groups of target pixel rows to display as black; and determining, by the m luminance sensors, an ambient light luminance value based on the optical signal.

In some embodiments, the non-transitory computer-readable storage medium, wherein the instructions stored therein that, when executed by an IC of an apparatus for determining ambient light luminance, cause the apparatus to perform a method for determining ambient light luminance, the method includes: sending, by the IC, second instruction information to the processor at intervals of a predetermined period, wherein the second instruction information is used for requesting the processor to adjust the level of the first control signal output to the m groups of inverse controllers to the first level; wherein the predetermined period comprises x duty cycle periods used for displaying one frame of image, the duty cycle period is a signal period of a second control signal, and the second control signal is used for controlling luminance of the display screen.

In some embodiments, the non-transitory computer-readable storage medium, wherein after sending, by the IC, the second instruction information to the processor at intervals of a predetermined period, the method further includes: adjusting, by the processor, the level of the first control signal output to the m groups of inverse controllers to the first level at intervals of a predetermined time duration; wherein the predetermined time duration is t+T×p, t being used for indicating that a level of the second control signal is the first level and indicating a time duration elapsed when the second control signal moves from a top of the display screen to a first luminance sensor, the m luminance sensors being arranged at intervals from up to down at a lower part of the display screen, T being used for indicating the predetermined period, and p being a positive integer.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the present disclosure, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that, in the related art, a luminance sensor in the sensors may be arranged below the display screen, to acquire the luminance value of the ambient light. The luminance sensor converts an optical signal transmitting through the display screen into an electrical signal, such that the terminal determines the luminance value corresponding to the electrical signal based on the electrical signal acquired by the luminance sensor. The luminance value corresponding to the electrical signal includes the luminance value of the ambient light and the luminance value of the display screen. Afterwards, the terminal acquires the luminance value of the display screen, and determines the luminance value of the ambient light based on the luminance value corresponding to the electrical signal and the luminance value of the display screen.

Because the luminance value of the display screen may be difficult to be acquired, the accuracy of the luminance value of the ambient light finally determined is low.

Various embodiments of the present disclosure provide an apparatus and method for determining ambient light luminance. The apparatus includes luminance sensors, inverse controllers and a processor. The inverse controller is configured to control luminance of first pixels in n rows of pixels in the display screen. The n rows of pixels may include m groups of target pixel rows, wherein each group of target pixel rows includes first pixels. The first pixel is a pixel arranged above the luminance sensor. The processor is configured to output the first control signal to the m groups of inverse controllers, and send the first instruction information to the m luminance sensors when the level of the first control signal is the first level, such that the m luminance sensors acquire an optical signal transmitting through the display screen. The first level is used for controlling the first pixels in the m groups of target pixel rows to display as black. Since the luminance sensor acquires the ambient light transmitting through the display screen when the first pixels display as black, the ambient light luminance value can be determined with no need to acquire the luminance value of the display screen. Compared with the related art, the accuracy in determining the ambient light luminance value is improved.

Figure 1:
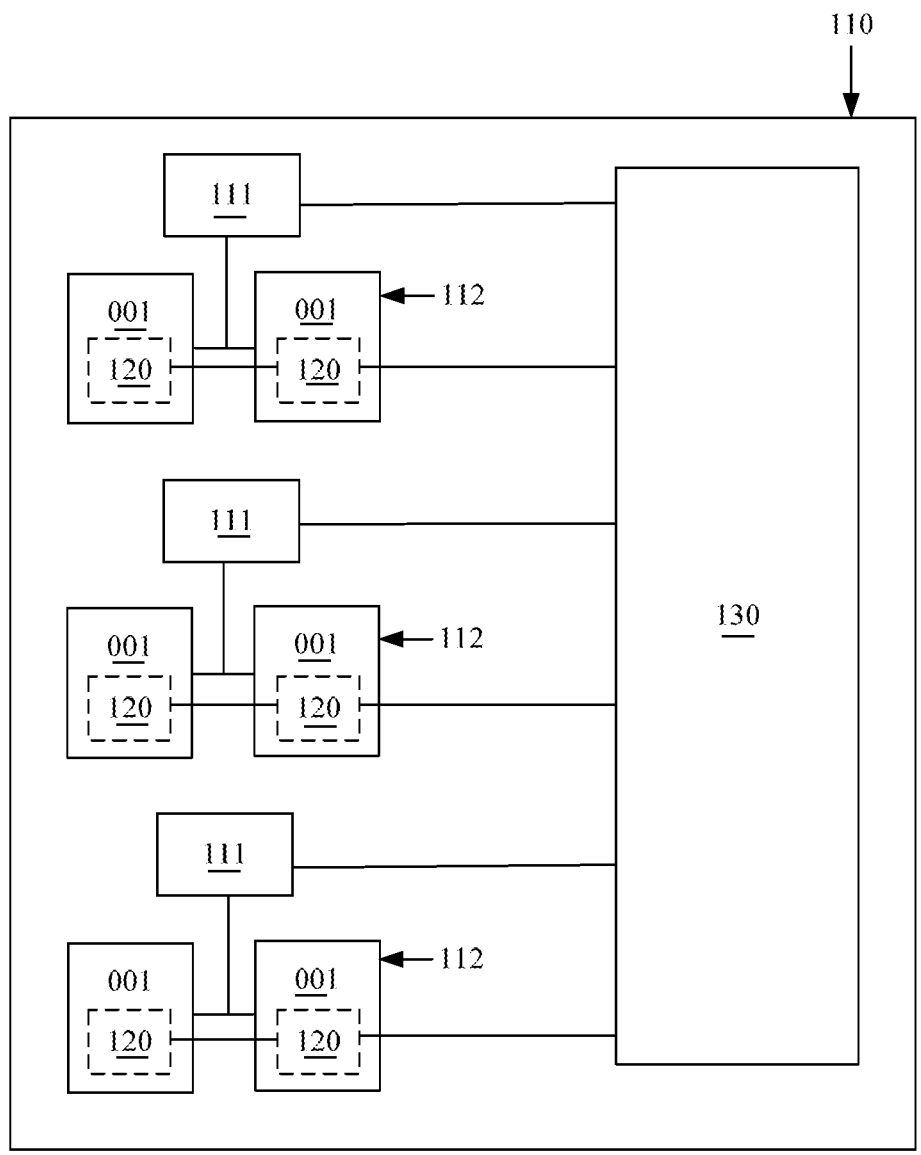
FIG. 1 is a block diagram of an apparatus for determining ambient light luminance according to some embodiments.

FIG. 1 is a block diagram of an apparatus for determining ambient light luminance according to some embodiments. As illustrated in FIG. 1, the apparatus may include: m luminance sensors 120, m groups of inverse controllers 111 and a processor 130. The inverse controller 111 is configured to control luminance of a first pixel 001 in n rows of pixels in a display screen 110. The n rows of pixels may include m groups of target pixel rows 112, where each group of the target pixel rows 112 may include the first pixels 001. The first pixel 001 in the $i^{th}$ group of target pixels rows 112 is a pixel located above the $i^{th}$ luminance sensor 120. m is greater than or equal to n. If m is equal to n, each row of pixels is a group of target pixel rows. If m is less than n, m-n groups of pixel rows do not include the first pixel.

In some embodiments, the display screen 110 may be an organic light-emitting diode (OLED) display screen, an active-matrix organic light-emitting diode (AMOLED) display screen or a micro organic light-emitting diode (micro OLED) display screen.

As illustrated in FIG. 1, the n rows of pixels include three groups of target pixel rows 112. The three groups of target pixel rows 112 include three groups of inverse controllers 111, and a luminance sensor 120 is arranged below the first pixel 001 in each group of target pixel rows 112.

The first pixels 001 in the $i^{th}$ group of target pixel row 112 are correspondingly connected to the $i^{th}$ group of inverse controllers 111, and the processor 130 is connected to the m groups of inverse controllers 111 and the m luminance sensors 120 respectively. Here, i is a positive integer. Exemplarily, i may be equal to 1. As illustrated in FIG. 1, the first pixels 001 in the first group of target pixel rows are connected to a first group of inverse controllers 111. That is, the first pixels 001 in each group of target pixel rows correspond to a group of inverse controllers 111.

The $i^{th}$ group of target pixel rows includes $k_i$ pixel rows, and the $i^{th}$ group of inverse controllers 111 includes $k_i$ inverse controllers 111, and the $h^{th}$ pixel row in the $k_i$ pixel rows is connected to the $h^{th}$ inverse controller 111 in the $i^{th}$ group of inverse controllers 111.

In some embodiments, each group of target pixel rows 112 may include one pixel row, and may also include a plurality of pixel rows. If each group of target pixel rows 112 includes one pixel row, the first group of inverse controllers 111 includes one inverse controller 111, the one pixel row is connected to the one inverse controller 111 in the first group of inverse controllers 111, and a luminance sensor 120 is arranged below the first pixel 001 in the one target pixel row 112.

If each group of target pixel rows 112 includes a plurality of pixel rows, the plurality of pixel rows include a plurality of inverse controllers 111, and a luminance sensor 120 is arranged below each of the first pixels 001 in the plurality of target pixel rows 112. Exemplarily, if i is equal to 1, $k_i$ is equal to 3 and his equal to 1, the first group of target pixel rows 112 includes three pixel rows, and the first group of inverse controllers includes three inverse controllers. The first pixel row in the three pixel rows is connected to the first inverse controller 111 in the first group of inverse controllers, and a luminance sensor 120 is arranged below each of the three pixel rows.

Figure 2:
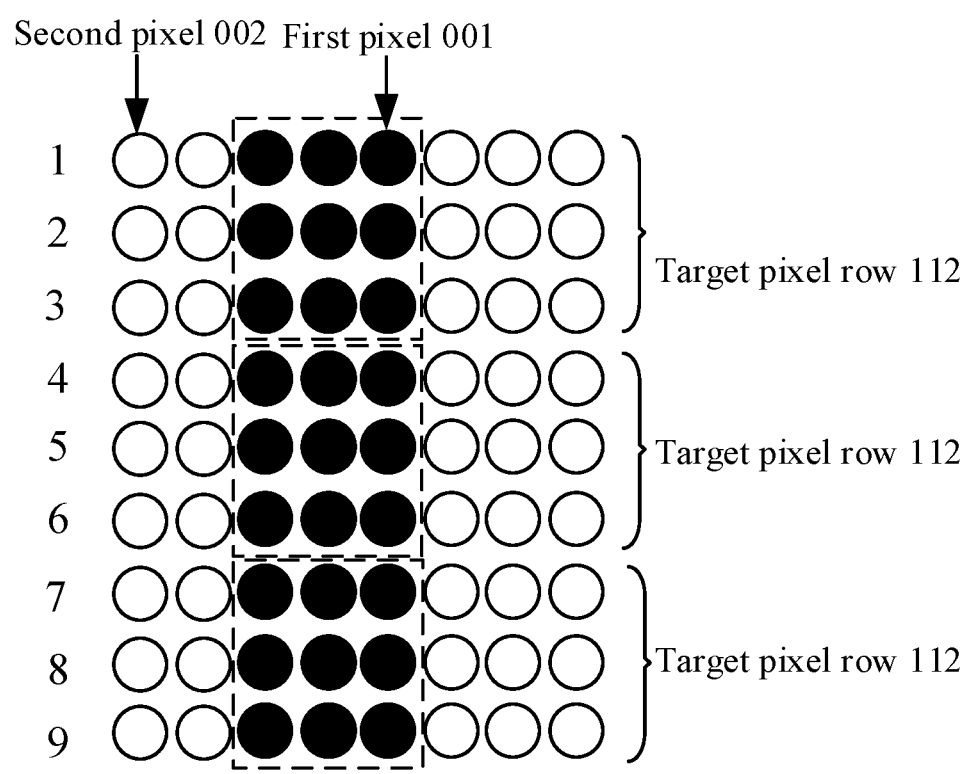
FIG. 2 is a schematic structural diagram of a plurality of groups of target pixel rows arranged on a display screen according to some embodiments.

As illustrated in FIG. 2, the display screen includes nine rows of pixels, and the nine rows of pixels include three groups of target pixel rows 112, wherein each group of target pixel rows 112 includes three rows of first pixels 001. By taking the first group of target pixel rows as an example, the first group of target pixel rows 112 includes three rows of first pixels 001 a luminance sensor (not shown in FIG. 2) is arranged below the three rows of first pixels 001, and each row of first pixels 001 in each group of target pixel rows 112 corresponds to an inverse controller (not shown in FIG. 2). Exemplarily, the first row of first pixels 001 in the first group of target pixel rows 112 is connected to the first inverse controller 111.

The processor 130 is configured to output a first control signal to the m groups of inverse controllers 111. The first control signal is used for controlling the luminance of the first pixels 001 in the m groups of target pixel rows 112. The level of the first control signal may be a high level or may be a low level.

The processor 130 may output the first control signal to the m groups of inverse controllers 111 simultaneously, so as to control the luminance of the first pixels 001 in the m groups of target pixel rows 112 simultaneously.

The processor 130 is further configured to send first instruction information to the m luminance sensors 120 when the level of the first control signal is a first level. The first instruction information is used for controlling the m luminance sensors 120 to acquire optical signals transmitting through the display screen 110, and the first level is used for controlling the first pixels 001 in the m groups of target pixel rows 112 to display as black. In some embodiments, description is given by taking a scenario where the first level is a high level as an example.

As illustrated in FIG. 1, assuming that m is equal to 3, then when the level of the first control signal is the first level, the first pixels 001 in the three groups of target pixel rows 112 are simultaneously displayed as black. In this case, upon receiving the first instruction information sent by the processor 130, the three luminance sensors 120 arranged below the first pixels 001 in the three groups of target pixel rows 112 acquire the optical signals transmitting through the display screen 110 simultaneously, where the optical signal represents the ambient light.

The m luminance sensors 120 are configured to determine the ambient light luminance value based on the optical signals.

In some embodiments, the luminance sensor 120 may convert the acquired optical signal into an electrical signal, and determine the ambient light luminance value based on the electrical signal. In some embodiments, the luminance sensor 120 may transmit the electrical signal upon conversion to the processor 130, such that the processor 130 determines the ambient light luminance value based on the electrical signal.

Since the luminance sensor 120 acquires the optical signal transmitting through the display screen 110 when the first pixel 001 is displayed as black, the ambient light luminance value may be determined with no need to acquire the luminance value of the display screen 110. Compared with the related art, the accuracy in determining the ambient light luminance value is improved.

Figure 3:
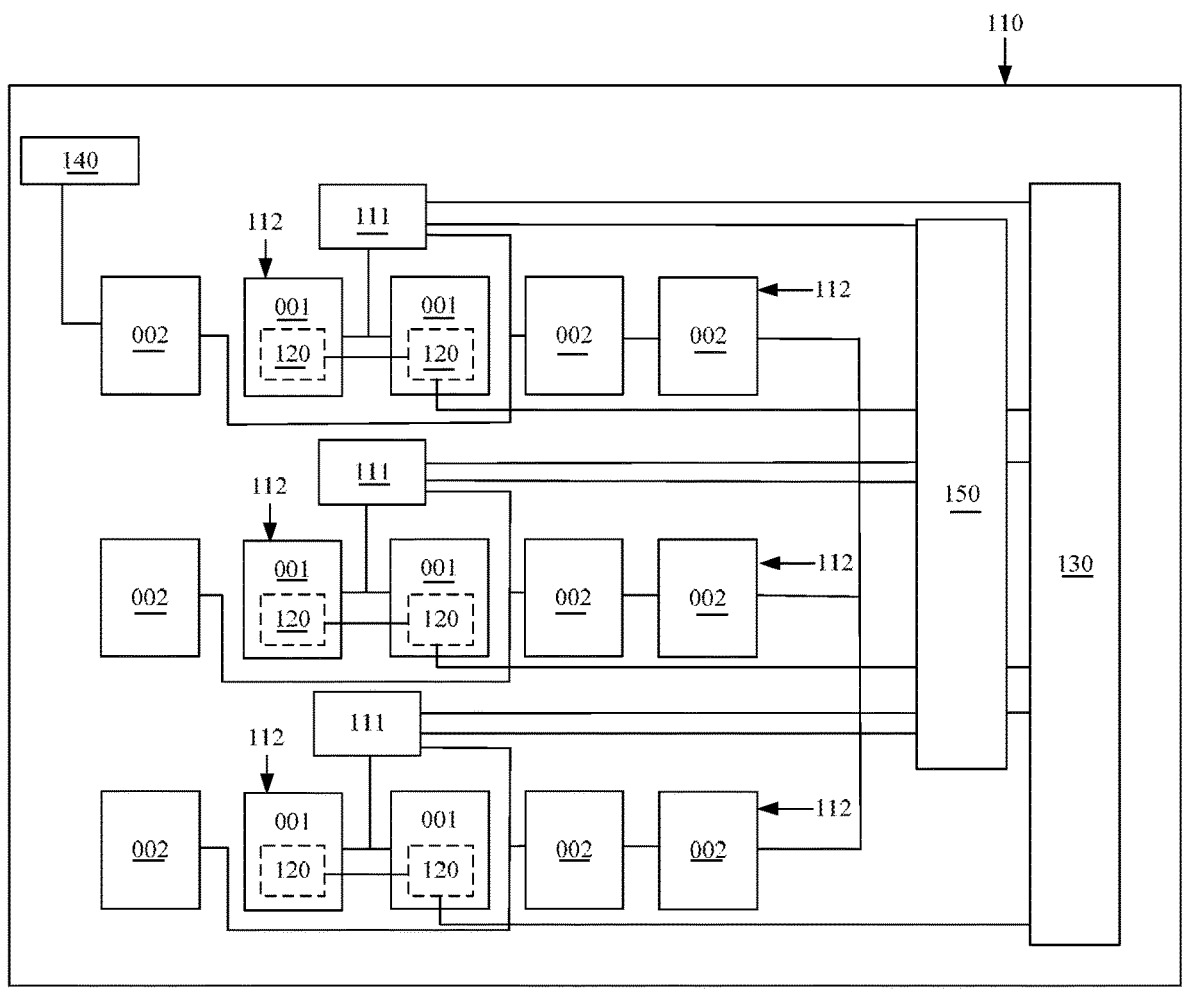
FIG. 3 is a block diagram of another apparatus for determining ambient light luminance according to some embodiments.

FIG. 3 is a block diagram of another apparatus for determining ambient light luminance according to some embodiments. As illustrated in FIG. 3, the apparatus further includes: an integrated circuit (IC) 140.

The target pixel rows 112 may further include a second pixel 002, where the second pixel 002 may be a pixel other than the first pixel 001. The second pixel 002 in the $i^{th}$ group of target pixel rows 112 may be connected to the $i^{th}$ group of inverse controllers 111 and the IC 140.

The $i^{th}$ group of target pixel rows includes $k_i$ pixel rows, and the $i^{th}$ group of inverse controllers includes $k_i$ inverse controllers. The $h^{th}$ pixel row in the $k_i$ pixel rows is connected to the $h^{th}$ inverse controller in the $i^{th}$ group of inverse controllers. Here, each group of target pixel rows 112 may only include the first pixel 001, or may include both the first pixel 001 and the second pixel 002.

Referring to FIG. 3, FIG. 3 illustrates a group of target pixel rows 112. The target pixel rows are the first group of target pixel rows 112 in FIG. 2. The target pixel rows 112 include three rows of first pixels 001 and three rows of second pixels 002. A luminance sensor 120 is arranged below each of the three rows of first pixels 001, and each row of first pixels 001 and each row of second pixels 002 in the target pixel rows 112 are all connected to corresponding inverse controller 111 thereof. Exemplarily, as illustrated in FIG. 3, the first row of first pixels 001 and the first row of second pixels 002 in the target pixel rows 112 are all connected to the first inverse controller 111.

In some embodiments, each row of second pixels 002 in each group of target pixel rows 112 are connected to the IC 140 via a duty cycle signal line. As illustrated in FIG. 2, the first row of second pixels 002 in the first group of target pixel rows are connected to the IC 140 via the duty cycle signal line, and the duty cycle signal lines of the other adjacent two rows of second pixels 002 are connected to each other.

In some embodiments, the IC 140 is configured to send second instruction information to the processor 130 at intervals of a predetermined period. The second instruction information is used for requesting the processor 130 to adjust the level of the first control signal output to the m groups of inverse controllers 111 to the first level. Exemplarily, the second instruction may be a pulse signal.

Here, the predetermined period may include x duty cycle periods used for displaying one frame of image, and the duty cycle period may be a signal period of a second control signal. The second control signal is used for controlling the luminance of the display screen 110. Exemplarily, the second control signal may be a pulse signal having a duty cycle. In some embodiments, the IC 140 may send the second instruction information to the processor 130 before one frame of image is displayed.

Exemplarily, x may be 4 or may be 8. That is, when one frame of image is displayed, four duty cycle periods may be included, or eight duty cycle periods may be included. It should be noted that in some embodiments, the number of duty cycle periods involved in displaying one frame of image is not limited herein.

In some embodiments, the IC 140 adjusts the luminance value of the display screen 110 by controlling the second control signal output to the display screen 110 within a duty cycle period. The second control signal within one duty cycle period may be at a low level or at a high level, or may be only at a low level, or may be only at a high level. Exemplarily, the high level is used for controlling the display screen to display as black, and the low level is used for controlling the luminance of the display screen. Assuming that the IC 140 only outputs a low level within a duty cycle period, and the luminance value of the display screen 110 is 100 nit, then if a desired luminance value of the display screen 110 is 60 nit, the ratio of the high levels to the low levels output by the IC 140 to the display screen 110 within a duty cycle period is 40:60, that is, 2:3.

Figure 4:
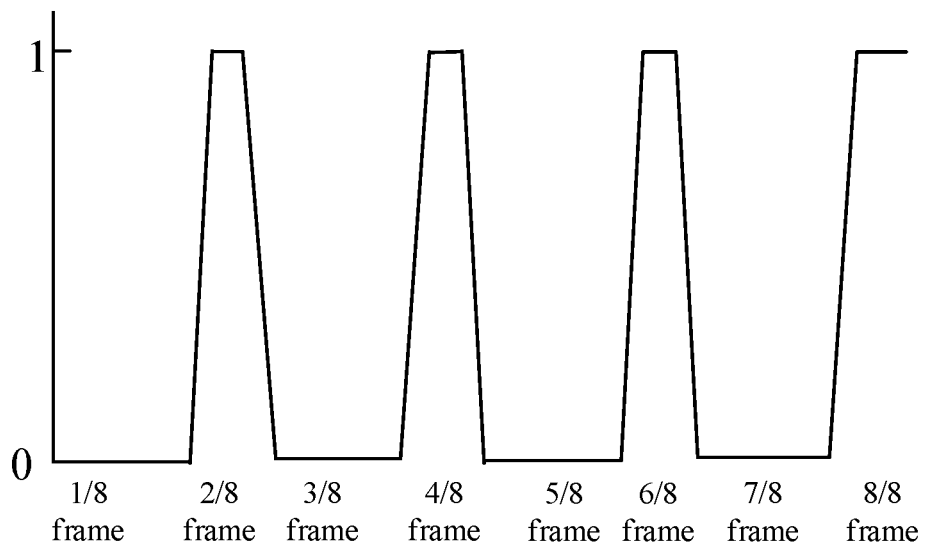
FIG. 4 is a timing sequence diagram of a control signal for displaying a frame of image according to some embodiments.
Figure 5:
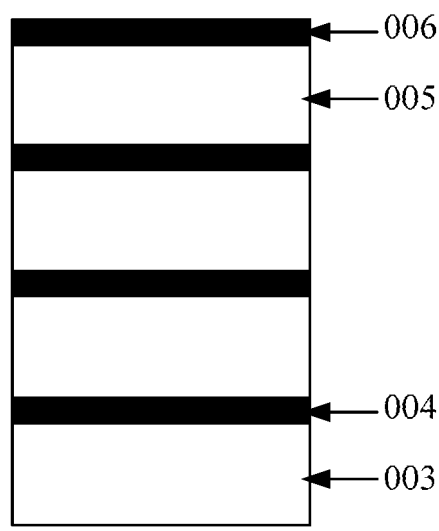
FIG. 5 is a schematic structural diagram of a second control signal for displaying a frame of image corresponding to FIG. 4 according to some embodiments.

Assuming that in the process of displaying one frame of image by the display screen 110, the IC needs to output a second control signal having four duty cycle periods to the display screen 110, then the second control signal sequentially moves from the top to the bottom of the display screen 110. FIG. 4 illustrates a timing sequence diagram of a control signal of displaying one frame of image. Here, the abscissa represents the display progress of each frame of image, and the ordinate represents the level of the second control signal output by the IC to the display screen. When the level of the second control signal output by the IC to the display screen is 1, it represents that the second control signal output by the IC to the display screen is at a high level. When the level of the second control signal output by the IC to the display screen is 0, it represents that the second control signal output by the IC to the display screen is at a low level. FIG. 5 illustrates a schematic structural diagram of the second control signal for displaying one frame of image on the display screen corresponding to FIG. 4.

Referring to FIG. 4, a first half of each duty cycle period is a low level and a second half thereof is a high level. In FIG. 4, the first half of the first duty cycle period corresponds to 003 in FIG. 5, and the second half of the first duty cycle period corresponds to 004 in FIG. 5. The second control signal of the first duty cycle period moves from the top of the display screen to the bottom of the display screen. In FIG. 4, the first half of the fourth duty cycle period corresponds to 005 in FIG. 5, and the second half of the fourth duty cycle period corresponds to 006 in FIG. 5.

By taking the scenario where the IC 140 outputs the second control signal to the three rows of second pixels 002 in FIG. 3 as an example, the first half of each duty cycle period is a low level and the second half thereof is a high level. When the first half of the first duty cycle period moves to the first row of second pixels 002, the first row of second pixels 002 display a luminance.

When the first half of the first duty cycle period moves downwardly to the second row of second pixels 002, and the second half of the first duty cycle period moves to the first row of second pixels 002, the second row of second pixels 002 display a luminance, and the first row of second pixels 002 display as black.

When the first half of the first duty cycle period moves downwardly to the third row of second pixels 002, the second half of the first duty cycle period moves to the second row of second pixels 002, and a first half of the second duty cycle period moves to the first row of second pixels 002, the third row of second pixels 002 display a luminance, the second row of second pixels 002 display as black, and the first row of second pixels 002 display a luminance.

Figure 6:
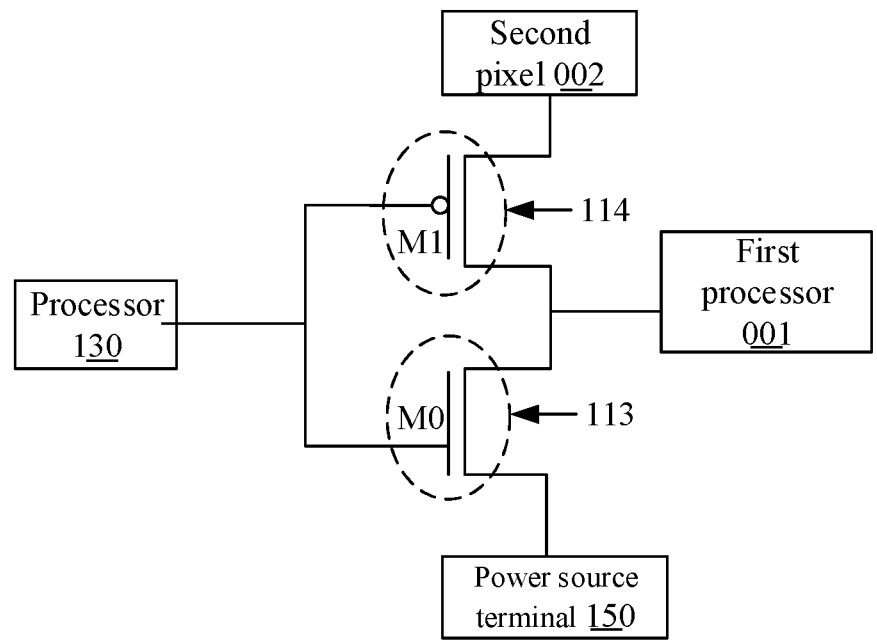
FIG. 6 is a schematic structural diagram of an inverse controller according to some embodiments.

In some embodiments, as illustrated in FIG. 3, the apparatus further includes: a power source terminal 150. The power source terminal 150 may be a VDD. FIG. 6 illustrates a schematic structural diagram of an inverse controller 111, wherein each inverse controller 111 may include a first switch module 113 and a second switch module 114. The first switch module 113 may include one control terminal and two connection terminals. The second switch module 114 may also include one control terminal and two connection terminals.

The control terminal of the $j^{th}$ first switch module 113 is connected to the processor 130, one connection terminal of the $j^{th}$ first switch module 113 is connected to the power source terminal 150, and the other connection terminal of the $j^{th}$ first switch module 113 is connected to the $j^{th}$ row of first pixels 001. Here, j is a positive integer. Exemplarily, j may be equal to 1.

In some embodiments, the $j^{th}$ first switch module 113 is configured to be turned on when the level of the first control signal is a first level, and to send a voltage signal provided by the power source terminal 150 to the $j^{th}$ row of first pixels 001 under control of the first control signal provided by the processor 130. The voltage signal may be at the first level.

The $j^{th}$ second switch module 114 is configured to be turned off when the level of the first control signal is the first level.

The $j^{th}$ first switch module 113, under control of the first control signal provided by the processor 130, sends the voltage signal provided by the power source terminal 150 to the $j^{th}$ row of first pixels 001, such that the $j^{th}$ row of first pixels 001 display as black.

In some embodiments, the IC 140 is configured to send the second control signal to the $j^{th}$ row of second pixels 002 when the level of the first control signal is the first level.

By taking the first inverse controller 111 in FIG. 3 as an example, when the level of the first control signal is the first level, the first switch module 113 in the first inverse controller is turned on, and the second switch module 114 is turned off. In this case, the first row of first pixels 001 receive a voltage signal provided by the power source terminal 150 and display as black under control of the voltage signal, where the voltage signal is at a high level. While, the first row of second pixels 002 receives the second control signal sent by the IC 140, where the second control signal may be at a high level or at a low level.

Exemplarily, as illustrated in FIG. 3, when the first control signal received by the three inverse controllers 111 in FIG. 3 and sent by the processor 130 is at the first level, the three rows of first pixels 001 all receive the voltage signal provided by the power source terminal 150 and display as black under control of the voltage signal, while the three rows of second pixels 002 all receive the second control signal sent by the IC 140.

By taking the scenario where the apparatus for determining ambient light luminance includes m groups of inverse controllers 111 as an example, if the first control signal is at the first level after each of the m groups of inverse controllers 111 receives the first control signal sent by the processor 130, the first pixels 001 in the m groups of target pixel rows 112 all receive the voltage signal provided by the power source terminal 150 and display as black under control of the voltage signal, while the second pixels 002 in the m groups of target pixel rows all receive the second control signal sent by the IC 140.

In some embodiments, the control terminal of the $j^{th}$ second switch module 114 is connected to the processor 130, one connection terminal of the $j^{th}$ second switch module 114 is connected to the $j^{th}$ row of first pixels 001, and the other connection terminal of the $j^{th}$ second switch module 114 is connected to the $j^{th}$ row of second pixels 002.

The $j^{th}$ first switch module 113 is configured to be turned off when the level of the first control signal is the second level.

The $j^{th}$ second switch module 114 is configured to be turned on when the level of the first control signal is the second level and send the second control signal to the $j^{th}$ row of first pixels 001 via the $j^{th}$ row of second pixels 002 under control of the first control signal provided by the processor 130. The second level may be a low level.

In some embodiments, after the m luminance sensors 120 acquire the optical signals transmitting through the display screen 110, the processor 130 adjusts the level of the first control signal sent to the m groups of inverse controllers 111 to the second level, such that the first switch module 113 in each inverse controller 111 is turned off, and the second switch module 114 is turned on.

The IC 140 is further configured to send the second control signal to the $j^{th}$ row of second pixels 002 when the level of the first control signal is the second level, such that the $j^{th}$ row of second pixels 002 sends the second control signal to the $j^{th}$ row of first pixels.

By taking the first inverse controller in FIG. 3 as an example, when the level of the first control signal is the second level, the first switch module 113 in the first inverse controller is turned off, and the second switch module 114 is turned on. In this case, the IC 140 sends the second control signal to the first row of second pixels 002, and sends the second control signal to the first row of first pixels 001 via the second switch module 114.

Exemplarily, as illustrated in FIG. 3, when the first control signal received by the three inverse controllers 111 in FIG. 3 from the processor 130 is the second level, the IC 140 sends the second control signal to three rows of second pixels 002, and sends the second control signal to three rows of first pixels 001 via the second switch module 114.

By taking the scenario where the apparatus for determining ambient light luminance includes m groups of inverse controllers as an example, after each of the m groups of inverse controllers receives the first control signal sent by the processor 130, the first control signal is at the second level, the IC 140 sends the second control signal to the second pixels 002 in the m groups of target pixel rows 112, and sends the second control signal to the first pixels 001 in the m groups of target pixel rows via the second switch module 114 in the m groups of inverse controllers.

That is, when the level of the first control signal is the first level, the first pixels 001 in the m groups of target pixel rows 112 receive the voltage signal sent by the power source terminal 150, and the second pixels 002 in the m groups of target pixel rows 112 receive the second control signal sent by the IC 140. When the level of the first control signal is the second level, the first pixels 001 and the second pixels 002 in the m groups of target pixel rows 112 all receive the second control signal sent by the IC 140.

In some embodiments, the processor 130 is configured to adjust the level of the first control signal output to the m groups of inverse controllers 111 to the first level at intervals of a predetermined time duration.

The predetermined time duration may be t+T×p, wherein t is used for indicating that a level of the second control signal is the first level and indicating a time duration elapsed when the second control signal moves from the top of the display screen 110 to the first luminance sensor 120; and the m luminance sensors are arranged t at intervals from up to down at a lower part of the display screen, wherein T is used for indicating the predetermined period, and p is a positive integer.

In some embodiments, if p is equal to 3, T×p is a time duration for displaying three frames of images.

In some embodiments, when the level of the first control signal output by the processor 130 to the m groups of inverse controllers 111 is the first level, the first pixels 001 in the m groups of target pixel rows 112 all receive the voltage signal provided by the power source terminal 150 and display as black under control of the voltage signal, such that the m luminance sensors 120 are simultaneously exposed upon receiving the first instruction information sent by the processor 130, and acquire the optical signals transmitting through the display screen 110. The optical signals are ambient light signals. After the m luminance sensors 120 are exposed, the processor 130 adjusts the level of the first control signal output to the m groups of inverse controllers 111 to the second level, such that the first pixels 001 and the second pixels 002 in the m groups of target pixel rows 112 all receive the second control signal sent by the IC 140, and thus the luminance of the display screen 110 is controlled.

That is, only when the level of the first control signal is the first level, the first pixels 001 in the m groups of target pixel rows 112 receive the voltage signal provided by the power source terminal 150. After the m luminance sensors 120 are exposed, the processor 130 adjusts the level of the first control signal output to the m groups of inverse controllers 111 to the second level. In this case, the first pixels 001 in the m groups of target pixel rows 112 all receive the second control signal sent by the IC 140 before the level of the first control signal is adjusted to the first level again. The second pixels 002 all receive the second control signal sent by the IC 140 regardless of whether the first control signal is the first level or the second level.

Therefore, the IC 140 may send the second instruction information to the processor 130 before each frame of image is displayed. In this case, the processor 130 can adjust the level of the first control signal output to the m groups of inverse controllers 111 to the first level upon receiving the second instruction information each time, or can adjust the level of the first control signal output to the m groups of inverse controllers 111 to the first level at intervals of a predetermined time duration.

By taking the three groups of target pixel rows 112 in FIG. 2 as an example, assuming that the first half of each duty cycle period is a low level, the second half thereof is a high level, and p is equal to 3, the processor 130 receives the second instruction information sent by the IC 140 for the fourth time before the fourth frame of image is displayed, then in the process of displaying the fourth frame of image, when the second half (in this case, the level of the second control signal is a high level) of the first duty cycle period output by the IC 140 to the display screen 110 moves from the top of the display screen 110 to the position of the first luminance sensor 120 (i.e., the luminance sensor 120 arranged below the three rows of the first pixels 001 in the first group of target pixel rows 112), the first row of first pixels 001 and the first row of second pixels 002 in the first group of target pixel rows 112 display as black under the action of the second control signal sent by the IC 140. That is, in this case, the level of the first control signal output by the processor 130 to the three groups of inverse controllers 111 is the second level. In order that three luminance sensors 120 are exposed when the first row of first pixels 001 and the first row of second pixels 002 in the first group of target pixel rows 112 display as black, the processor 130 needs to adjust the first control signal output to the three groups of inverse controllers 111 from the second level to the first level, such that the first pixels 001 in three groups of target pixel rows 112 in FIG. 2 all receive the voltage signal provided by the power source terminal 150, and the first pixels 001 in the three groups of target pixel rows 112 all display as black under control of the voltage signal. Afterwards, the processor 130 sends the first instruction information to the three luminance sensors 120, such that the three luminance sensors 120 arranged below the first pixels 001 in the three groups of target pixel rows 112 may be simultaneously exposed, and acquire the optical signals transmitting through the display screen 110.

When the first row of first pixels 001 and the first row of second pixels 002 in the first group of target pixel rows 112 display as black, the processor 130 adjusts the level of the first control signal sent to the m groups of inverse controllers 111 to the first level, such that the first pixels 001 in the m groups of target pixel rows all display as black, to synchronize with the first row of first pixels 001 and the first row of second pixels 002 in the first group of target pixel rows 112 which display black. Thus, the difference of display luminance between the first pixels 001 and the second pixels 002 is reduced, and therefore the display effect of the display screen is improved.

In some embodiments, as illustrated in FIG. 6, each first switch module 113 may include a first switch transistor M0. The gate of the $j^{th}$ first switch transistor M0 is connected to the processor, the source of the $j^{th}$ first switch transistor M0 is connected to the power source terminal 150, and the drain of the $j^{th}$ first switch transistor M0 is connected to the $j^{th}$ row of first pixels 001.

The $j^{th}$ first switch transistor M0 may be turned on when the level of the first control signal provided by the processor 130 is an effective level, receives a voltage signal sent by the power source terminal 150 via the source, and sends the received voltage signal to the $j^{th}$ row of first pixels 001 via the drain, such that the $j^{th}$ row of first pixels 001 display as black. The first switch transistor M0 may be an N-type transistor or may be a P-type transistor. When the first switch transistor M0 is an N-type transistor, the effective level may be a high level. When the first switch transistor M0 is a P-type transistor, the effective level may be a low level. FIG. 6 exemplarily illustrates that the first switch transistor M0 is an N-type transistor, and in this case, the effective level is a high level.

In some embodiments, as illustrated in FIG. 6, each second switch module 115 may include a second switch transistor M1. The gate of the $j^{th}$ second switch transistor M1 is connected to the processor 130, the source of the $j^{th}$ second switch transistor M1 is connected to the $j^{th}$ row of second pixels 002, and the drain of the $j^{th}$ second switch transistor M1 is connected to the $j^{th}$ row of first pixels 001.

When the level of the first control signal provided by the processor 130 is an effective level, the $j^{th}$ second switch transistor M1 may receive the second control signal sent by the $j^{th}$ row of second pixels 002 via the source, and send the received second control signal to the $j^{th}$ row of first pixels 001 via the drain. The second control signal is sent by the IC 140 to the $j^{th}$ row of second pixels 002. When the second switch transistor M1 is an N-type transistor, the effective level may be a high level. When the second switch transistor M1 is a P-type transistor, the effective level may be a low level. FIG. 6 exemplarily illustrates that the second switch transistor M1 is a P-type transistor, and in this case, the effective level is a low level.

In other words, some embodiments of the present disclosure provide an apparatus for determining ambient light luminance. The apparatus includes luminance sensors, inverse controllers and a processor. The inverse controller is configured to control luminance of first pixels in n rows of pixels in the display screen. The n rows of pixels may include m groups of target pixel rows, wherein each group of target pixel rows includes first pixels. The first pixel is a pixel arranged above the luminance sensor. The processor is configured to output the first control signal to the m groups of inverse controllers, and send the first instruction information to the m luminance sensors when the level of the first control signal is the first level, such that the m luminance sensors acquire optical signals transmitting through the display screen. The first level is used for controlling the first pixels in the m groups of target pixel rows to display as black. Since the luminance sensor acquires the ambient light transmitting through the display screen when the first pixels display as black, the ambient light luminance value can be determined with no need to acquire the luminance value of the display screen. Compared with the related art, the accuracy in determining the ambient light luminance value is improved.

Figure 7:
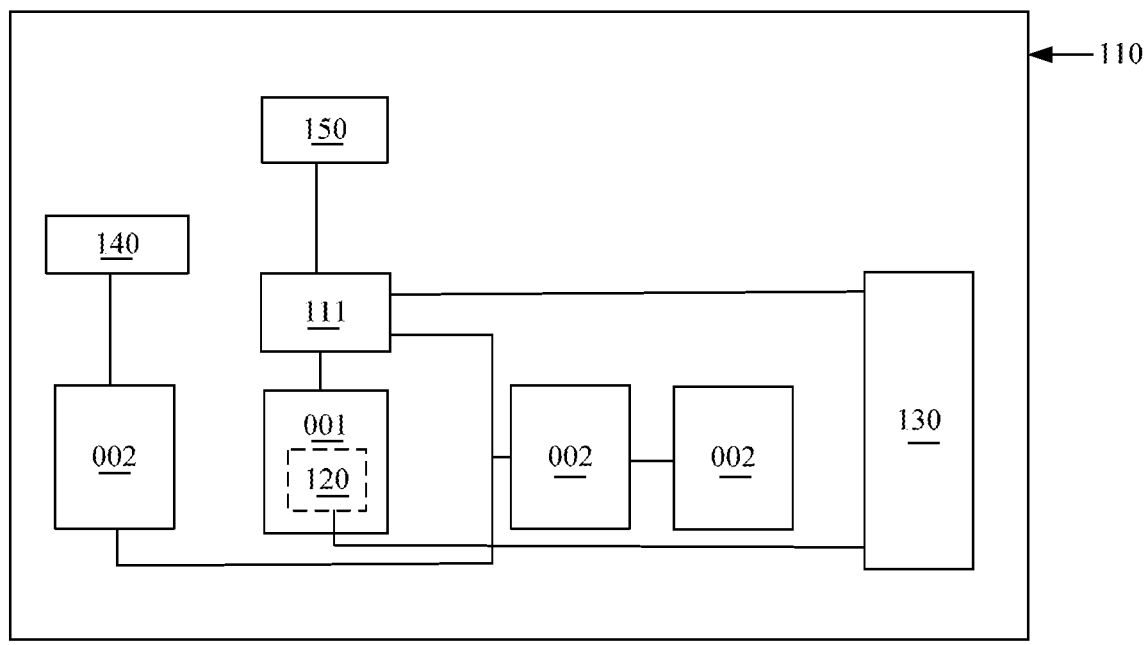
FIG. 7 is a block diagram of a display screen according to some embodiments.

Some embodiments of the present disclosure provide a display screen 110. The display screen 110 includes the apparatus for determining ambient light luminance illustrated in FIG. 1 or FIG. 3. The luminance sensors 120 in the apparatus for determining ambient light luminance are arranged at a lower part of the display screen 110. FIG. 7 illustrates a block diagram of a display screen, which includes the apparatus for determining ambient light luminance illustrated in FIG. 3.

Figure 8:
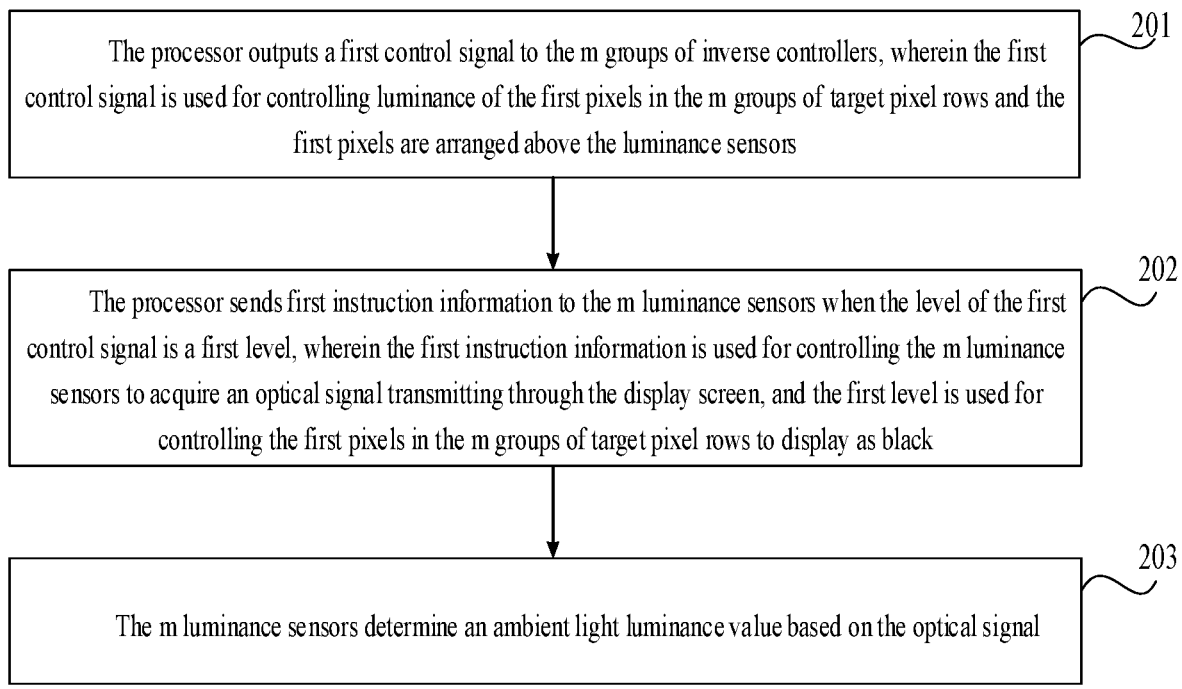
FIG. 8 is a flow chart of a method for determining ambient light luminance according to some embodiments.

Some embodiments of the present disclosure provide a method for determining ambient light luminance, wherein the method is applied to the apparatus for determining ambient light luminance illustrated in FIG. 1 or FIG. 3. As shown in FIG. 8, the method may include following steps.

In step 201, the processor outputs a first control signal to the m groups of inverse controllers, wherein the first control signal is used for controlling luminance of the first pixels in the m groups of target pixel rows and the first pixels are arranged above the luminance sensors.

The level of the first control signal may be a high level, and may also be a low level.

The processor 130 can output the first control signal simultaneously to the m groups of inverse controllers 111, so as to simultaneously control the luminance of the first pixels 001 in the m groups of target pixel rows.

In step 202, the processor sends first instruction information to the m luminance sensors when the level of the first control signal is a first level, wherein the first instruction information is used for controlling the m luminance sensors to acquire an optical signal transmitting through the display screen, and the first level is used for controlling the first pixels in the m groups of target pixel rows to display as black.

Exemplarily, the first level can be a high level, which is used for controlling the display screen 110 to display as black.

The first instruction information is used for indicating the optical signal transmitting through the display screen 110 acquired by the m luminance sensors 120. Since the luminance sensors 120 acquire the optical signals transmitting through the display screen 110 when the first pixels 001 display as black, the optical signal acquired by the luminance sensors 120 is ambient light.

In step 203, the m luminance sensors determine an ambient light luminance value based on the optical signal.

In some embodiments, the luminance sensors 120 can convert the acquired optical signal into an electrical signal, and determine the ambient light luminance value based on the electrical signal. In some embodiments, the luminance sensors 120 can convert the acquired optical signal into an electrical signal, and send the electrical signal to the processor 130, such that the processor 130 determines the ambient light luminance value based on the electrical signal.

In other words, some embodiments of the present disclosure provide a method for determining ambient light luminance. The processor outputs the first control signal to the m groups of inverse controllers, and sends the first instruction information to the m luminance sensors when the level of the first control signal is the first level. The m luminance sensors determine the ambient light luminance value based on the optical signal. Here, the first level is used for controlling the display screen to display as black. Since the luminance sensor acquires the ambient light transmitting through the display screen when the display screen displays as black, the ambient light luminance value can be determined with no need to acquire the luminance value of the display screen. Compared with the related art, the accuracy in determining the ambient light luminance value is improved.

Figure 9:
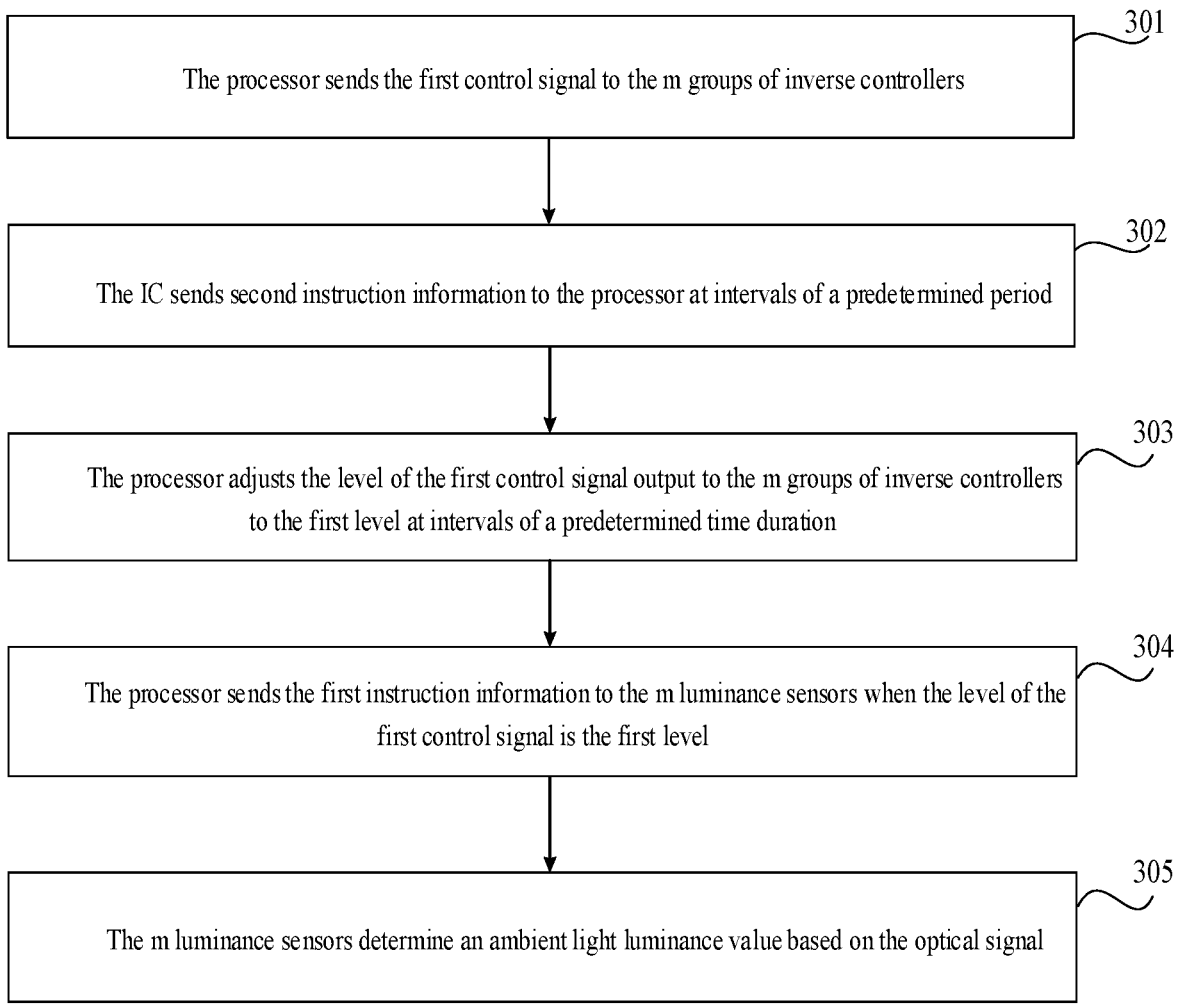
FIG. 9 is a flow chart of another method for determining ambient light luminance according to some embodiments.

Some embodiments of the present disclosure provide another method for determining ambient light luminance, wherein the method is applied to the apparatus for determining ambient light luminance illustrated in FIG. 1 or FIG. 3. As shown in FIG. 9, the method may include the following steps.

In step 301, the processor sends the first control signal to the m groups of inverse controllers.

The first control signal is used for controlling the luminance of the first pixels 001 in the m groups of target pixel rows, and the first pixels 001 are arranged above the luminance sensors 120.

Exemplarily, the level of the first control signal may be the first level, and may also be the second level. The first level is a high level relative to the second level, and may also be a low level. In some embodiments, an example in which the first level is a high level and the second level is a low level is taken for illustration.

When the level of the first control signal output by the processor 130 to the m groups of inverse controllers 11 is the first level, the first switch module 113 in the $j^{th}$ inverse controller 111 is turned on, and the second switch module 114 in the $j^{th}$ inverse controller is turned off. In this case, the $j^{th}$ row of first pixels 001 receive a voltage signal provided by the power source terminal 150 and display as black under control of the voltage signal, while the $j^{th}$ row of second pixels 002 receive the second control signal sent by the IC 140, wherein the second control signal may be at a high level or a low level. Here, the level of the voltage signal may be the first level.

When the level of the first control signal output by the processor 130 to the m groups of inverse controllers 111 is the second level, the second switch module 114 in the $j^{th}$ inverse controller 111 is turned on, and the first switch module 113 is turned off. In this case, the IC 140 sends the second control signal to the $j^{th}$ row of second pixels 002, and sends the second control signal to the $j^{th}$ row of first pixels 001 via the second switch module 114.

In step 302, the IC sends second instruction information to the processor at intervals of a predetermined period.

The second instruction information is used for requesting the processor to adjust the level of the first control signal output to the m groups of inverse controllers 111 to the first level. Exemplarily, the second instruction information may be a pulse signal.

Here, the predetermined period may include x duty cycle periods used for displaying one frame of image, wherein the duty cycle period may be the signal period of the second control signal. The second control signal is used for controlling the luminance of the display screen 110. Exemplarily, the second control signal may be a pulse signal having a duty cycle. In some embodiments, the IC 140 may send the second instruction information to the processor 130 before one frame of image is displayed.

Exemplarily, x may be 4 or may be 8. That is, when one frame of image is displayed, four duty cycle periods may be included, or eight duty cycle periods may be included. It should be noted that in some embodiments, the number of duty cycle periods for displaying one frame of image is not limited herein.

In step 303, the processor adjusts the level of the first control signal output to the m groups of inverse controllers to the first level at intervals of a predetermined time duration.

The first control signal is used for controlling the luminance of the first pixels 001 in the m groups of target pixel rows, and the first pixel 001 is arranged above the luminance sensor 120.

The predetermined time duration may be t+T×p, wherein t is used for indicating that the level of the second control signal is the first level and indicating a time duration elapsed when the second control signal moves from the top of the display screen to the first luminance sensor; and the m luminance sensors are arranged at intervals from up to down at a lower part of the display screen, T is used for indicating the predetermined period, and p can be a positive integer.

Exemplarily, if p is equal to 3, T×p is a time duration elapsed for displaying three frames of images.

In some embodiments, when the level of the first control signal output by the processor 130 to the m groups of inverse controllers 111 is the first level, the first pixels 001 in the m groups of target pixel rows 112 all receive the voltage signal provided by the power source terminal 150 and display as black under control of the voltage signal. When the level of the first control signal output by the processor 130 to the m groups of inverse controllers 111 is the second level, the first pixels 001 in the m groups of target pixel rows 112 and the second pixels 002 in the m groups of target pixel rows 112 all receive the second control signal sent by the IC 140, so as to control the luminance of the display screen 110. Therefore, the IC 140 may send the second instruction information sent to the processor 130 before each frame of image is displayed. In this case, the processor 130 may adjust the level of the first control signal output to the m groups of inverse controllers 111 to the first level upon receiving the second instruction information each time, or may adjust the level of the first control signal output to the m groups of inverse controllers 111 to the first level at intervals of a predetermined time duration.

By taking the three groups of target pixel rows 112 in FIG. 2 as an example, assuming that the first half of each duty cycle period is a low level, the second half thereof is a high level, and p is equal to 3, then before the fourth frame of image is displayed, the processor 130 receives the second instruction information sent by the IC 140 for the fourth time. In this case, in the process of displaying the fourth frame of image, when the second half (the level of the second control signal is a high level) of the first duty cycle period output by the IC 140 to the display screen 110 moves from the top of the display screen 110 to the position of the first luminance sensor 120 (i.e., the luminance sensor 120 arranged below the three rows of the first pixels 001 in the first group of target pixel rows 112), the first row of target pixels 112 in the first group of target pixel rows 112 display as black under the control of the second control signal output by the IC 140. That is, in this case, the level of the first control signal output by the processor to the three groups of inverse controllers is the second level. In order that three luminance sensors are exposed when the first row of first pixels 001 and the first row of second pixels 002 in the first group of target pixel rows 112 display as black, the processor 130 needs to adjust the first control signal output to the three groups of inverse controllers 111 from the second level to the first level, such that the first pixels 001 in the three groups of target pixel rows 112 in FIG. 2 all receive the voltage signal provided by the power source terminal 150, and the first pixels 001 in the three groups of target pixel rows 112 all display as black under control of the voltage signal.

In step 304, when the level of the first control signal is the first level, the processor sends the first instruction information to the m luminance sensors.

The first instruction is used for controlling the m luminance sensors 120 to acquire the optical signals transmitting through the display screen 110, and the first level is used for controlling the m groups of first pixels 001 to display as black.

In step 303, when the first pixels 001 in the m groups of target pixel rows 112 all receive the voltage signal provided by the power source terminal 150 and display as black under control of the voltage signal, the processor 130 sends the first instruction information to the m luminance sensors, such that the m luminance sensors are simultaneously exposed upon receiving the first instruction information sent by the processor 130 and acquire the optical signals transmitting through the display screen 110. The optical signals are ambient light signals. After the m luminance sensors 120 are exposed, the processor 130 adjusts the level of the first control signal output to the m groups of inverse controllers 111 to the second level, such that the first pixels 001 and the second pixels 002 in the m groups of target pixel rows 112 all receive the second control signal sent by the IC 140, and thus the luminance of the display screen 110 is controlled.

In some embodiments, only when the level of the first control signal is the first level, the first pixels 001 in the m groups of target pixel rows 112 receive the voltage signal provided by the power source terminal and display as black under control of the voltage signal. After the m luminance sensors 120 are exposed, the processor 130 adjusts the level of the first control signal output to the m groups of inverse controllers 111 to the second level. In this case, the first pixels 001 in the m groups of target pixel rows 112 all receive the second control signal sent by the IC 140 before the level of the first control signal is adjusted to the first level again.

In step 305, the m luminance sensors determine an ambient light luminance value based on the optical signal.

In some embodiments, the luminance sensor 120 may convert the acquired optical signal into an electrical signal, and determine the ambient light luminance value based on the electrical signal. In some embodiments, the luminance sensor 120 may convert the acquired optical signal into an electrical signal, and send the electrical signal to the processor 130, such that the processor 130 determines the ambient light luminance value based on the electrical signal.

It should be noted that sequence of the steps in the method for determining ambient light luminance provided in the embodiments of the present disclosure may be adjusted appropriately, and the steps may be deleted or added according to the situation. Within the technical scope disclosed in the present disclosure, any variations of the method easily derived by a person of ordinary skill in the art shall fall within the protection scope of the present disclosure, which is not repeated here.

In other words, some embodiments of the present disclosure provides a method for determining ambient light luminance. The processor outputs the first control signal to the m groups of inverse controllers, and sends the first instruction information to the m luminance sensors when the level of the first control signal is the first level. The m luminance sensors determine the ambient light luminance value based on the optical signal. Here, the first level is used for controlling the display screen to display as black. Since the luminance sensor acquires the ambient light transmitting through the display screen when the display screen displays as black, the ambient light luminance value can be determined with no need to acquire the luminance value of the display screen. Compared with the related art, the accuracy in determining the ambient light luminance value is improved.

Figure 10:
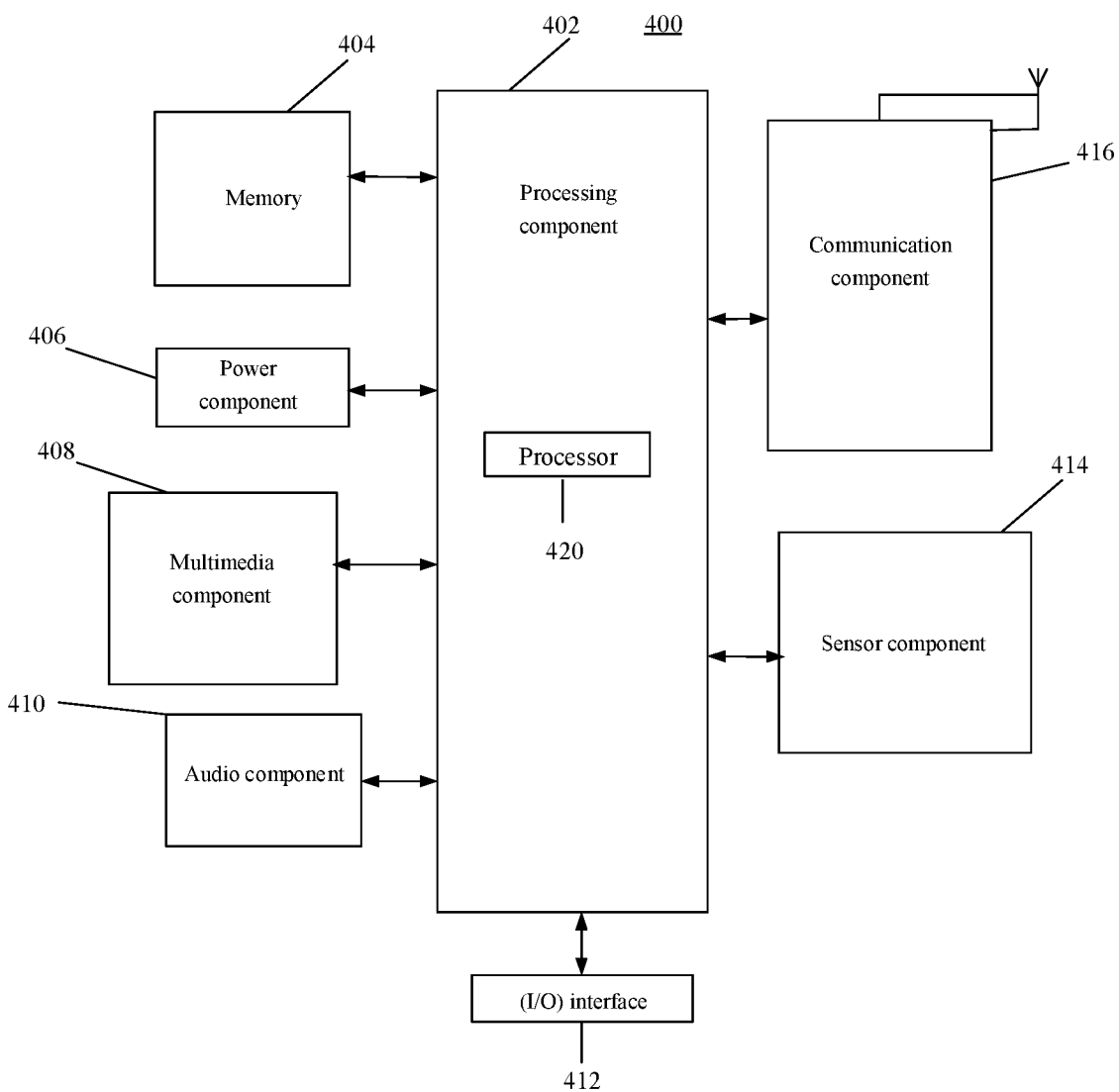
FIG. 10 is a block diagram of an apparatus for determining ambient light luminance according to some embodiments.

FIG. 10 is a block diagram of an apparatus 400 for determining the ambient light luminance according to some embodiments. In an example, the apparatus 400 may be a mobile phone, a computer, a digital broadcast terminal, a messaging device, a gaming console, a tablet, a medical device, exercise equipment, a personal digital assistant, and the like.

Referring to FIG. 10, the apparatus 400 may include one or more of the following components: a processing component 402, a memory 404, a power component 406, a multimedia component 408, an audio component 410, an input/output (I/O) interface 412, a sensor component 414, and a communication component 416.

It is noted that the various device components, units, blocks, or portions may have modular configurations, or are composed of discrete components, but nonetheless may be referred to as "modules" in general. In other words, the "modules" or "units" referred to herein may or may not be in modular forms.

The processing component 402 typically controls the overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. In an example, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. In an example, the audio component 410 includes a microphone ("MIC") configured to receive an external audio signals when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a start button, and a lock button.

The sensor component 414 includes one or more sensors to provide status assessments of various aspects of the apparatus 400. In an example, the sensor component 414 may detect an on/off status of the apparatus 400, relative positioning of components, e.g., the display device and the mini keyboard keypad, of the apparatus 400, a position change of the apparatus 400 or a component of the apparatus 400, a presence or absence of user contact with the apparatus 400, an orientation or an acceleration/deceleration of the apparatus 400, and temperature change of the apparatus 400. The sensor component 414 may include a proximity sensor configured to detect the presence of nearby objects without any physical contact. The sensor component 414 may also include a light sensor, such as a CMOS or CCD image sensor, used for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G; or 3G; or a combination thereof. In some embodiments, the communication component 416 receives a broadcast signal or broadcast associated information from an external broadcast management system via a broadcast channel.

In some embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the apparatus for determining ambient light luminance is integrated with the mobile phone; in some other embodiments, the apparatus can be a plug-and-play device for the mobile phone, and can access and be controlled by the programs/apps/instructions stored on the phone. In some implementations, the apparatus can draw power from the phone. In some other implementations, the apparatus can have its own battery.

With respect to the apparatus in the above embodiments, the specific manners for performing operations for individual modules therein have been described in detail in the embodiments regarding the relevant methods, which will not be elaborated herein.

At least some of the embodiments of the present disclosure can have one or more of the following advantages: The embodiments of the present disclosure provide an apparatus and method for determining ambient light luminance. The apparatus includes luminance sensors, inverse controllers and a processor. The inverse controller is configured to control luminance of first pixels in n rows of pixels in the display screen. The n rows of pixels may include m groups of target pixel rows, wherein each group of target pixel rows includes first pixels. The first pixel is a pixel arranged above the luminance sensor. The processor is configured to output the first control signal to the m groups of inverse controllers, and send the first instruction information to the m luminance sensors when the level of the first control signal is the first level, such that the m luminance sensors acquire an optical signal transmitting through the display screen. The first level is used for controlling the first pixels in the m groups of target pixel rows to display as black. Since the luminance sensor acquires the ambient light transmitting through the display screen when the first pixels display as black, the ambient light luminance value can be determined with no need to acquire the luminance value of the display screen. Compared with the related art, the accuracy in determining the ambient light luminance value is improved.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the apparatus for determining ambient light luminance, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An apparatus for determining an ambient light luminance, comprising:
   m luminance sensors;
   m groups of inverse controllers; and
   a processor;
   wherein:
   the inverse controllers are configured to control luminance of first pixels in n rows of pixels in a display screen;
   the n rows of pixels comprising m groups of target pixel rows, each group of the target pixel rows comprising the first pixels;
   a first pixel in an $i^{th}$ group of target pixel rows being a pixel located above an $i^{th}$ luminance sensor;
   the first pixels in the $i^{th}$ group of target pixel rows are correspondingly coupled to an $i^{th}$ group of inverse controllers;
   the processor is coupled to the m groups of inverse controllers and the m luminance sensors;
   m is less than or equal to n; and
   i is a positive integer.

2. The apparatus according to claim 1, wherein the $i^{th}$ group of target pixel rows comprise $k_i$ pixel rows, the $i^{th}$ group of inverse controllers comprise $k_i$ inverse controllers, and an $h^{th}$ pixel row in the $k_i$ pixel rows is connected to an $h^{th}$ inverse controller in the $i^{th}$ group of inverse controllers.

3. The apparatus according to claim 1, wherein:
   the processor is configured to output a first control signal to the m groups of inverse controllers, wherein the first control signal is used for controlling luminance of the first pixels in the m groups of target pixel rows;
   the processor is further configured to send first instruction information to the m luminance sensors when a level of the first control signal is a first level, wherein the first instruction information is used for controlling the m luminance sensors to acquire an optical signal transmitting through the display screen, and the first level is used for controlling the first pixels in the m groups of target pixel rows to display as black; and
   the m luminance sensors are configured to determine an ambient light luminance value based on the optical signal.

4. The apparatus according to claim 3, wherein:
   the processor is configured to adjust the level of the first control signal output to the m groups of inverse controllers to the first level at intervals of a predetermined time duration; and
   the predetermined time duration is t+T×p, t being used for indicating that a level of a second control signal is the first level and indicating a time duration elapsed when the second control signal moves from a top of the display screen to a first luminance sensor, the m luminance sensors being arranged at intervals from up to down at a lower part of the display screen, T being used for indicating a predetermined period, and p being a positive integer.

5. The apparatus according to claim 1, further comprising:
   an integrated circuit (IC);
   wherein:
   the target pixel row further comprises a second pixel, wherein the second pixel is a pixel other than the first pixel; and
   the second pixels in the $i^{th}$ group of target pixel rows are connected to the $i^{th}$ group of inverse controllers and the IC.

6. The apparatus according to claim 5, wherein:
   the IC is configured to send second instruction information to the processor at intervals of a predetermined period, wherein the second instruction information is used for requesting the processor to adjust a level of a first control signal output to the m groups of inverse controllers to a first level; and
   the predetermined period comprises x duty cycle periods used for displaying one frame of image, the duty cycle period is a signal period of a second control signal, and the second control signal is used for controlling luminance of the display screen.

7. The apparatus according to claim 5, further comprising: a power source terminal; wherein each of the inverse controllers comprises: a first switch module and a second switch module; wherein:
   a control terminal of a $j^{th}$ first switch module is connected to the processor, one connection terminal of the $j^{th}$ first switch module is connected to the power source terminal, and the other connection terminal of the $j^{th}$ first switch module is connected to a $j^{th}$ row of first pixels;
   a control terminal of a $j^{th}$ second switch module is connected to the processor, one connection terminal of the $j^{th}$ second switch module is connected to the $j^{th}$ row of first pixels, and the other connection terminal of the $j^{th}$ second switch module is connected to a $j^{th}$ row of second pixels; and
   j is a positive integer.

8. The apparatus according to claim 7, wherein:
   the $j^{th}$ first switch module is configured to be turned on when a level of a first control signal is a first level and to send a voltage signal provided by the power source terminal to the $j^{th}$ row of first pixels under control of the first control signal provided by the processor, the voltage signal being at the first level;
   the $j^{th}$ first switch module is further configured to be turned off when the level of the first control signal is a second level;
   the $j^{th}$ second switch module is configured to be turned off when the level of the first control signal is the first level; and
   the $j^{th}$ second switch module is further configured to be turned on when the level of the first control signal is the second level, and to send a second control signal to the $j^{th}$ row of first pixels via the $j^{th}$ row of second pixels under control of the first control signal provided by the processor.

9. The apparatus according to claim 8, wherein:
   the IC is configured to send the second control signal to the $j^{th}$ row of second pixels when the level of the first control signal is the first level; and
   the IC is further configured to send the second control signal to the $j^{th}$ row of second pixels when the level of the first control signal is the second level, to enable the $j^{th}$ row of second pixels to send the second control signal to the $j^{th}$ row of first pixels.

10. The apparatus according to claim 8, wherein each of the first switch modules comprises a first switch transistor, and each of the second switch modules comprises a second switch transistor; wherein:
    a gate of a $j^{th}$ first switch transistor is connected to the processor, a source of the $j^{th}$ first switch transistor is connected to the power source terminal, and a drain of the $j^{th}$ first switch transistor is connected to the $j^{th}$ row of first pixels; and a gate of a $j^{th}$ second switch transistor is connected to the processor, a source of the $j^{th}$ second switch transistor is connected to the $j^{th}$ row of second pixels, and a drain of the $j^{th}$ second switch transistor is connected to the $j^{th}$ row of first pixels.

11. A display screen, comprising the apparatus for determining ambient light luminance according to claim 1; wherein luminance sensors in the apparatus are arranged at a lower part of the display screen.

12. A terminal comprising the apparatus according to claim 1, further comprising a microphone and a speaker.

13. The terminal according to claim 12, wherein the mobile terminal is a mobile phone, and the processor is a central processing unit (CPU) of the mobile phone.

14. The terminal of claim 12, wherein the terminal is a smart television.

15. A method for determining ambient light luminance, wherein the method is applied to an apparatus for determining ambient light luminance and comprises:

outputting, by a processor, a first control signal to m groups of inverse controllers, wherein the first control signal is used for controlling luminance of first pixels in m groups of target pixel rows and the first pixels are arranged above m luminance sensors;

sending, by the processor, first instruction information to the m luminance sensors when a level of the first control signal is a first level, wherein the first instruction information is used for controlling the m luminance sensors to acquire an optical signal transmitting through a display screen, and the first level is used for controlling the first pixels in the m groups of target pixel rows to display as black; and determining, by the m luminance sensors, an ambient light luminance value based on the optical signal.

16. The method according to claim 15, wherein the apparatus for determining ambient light luminance further comprises an IC, the method further comprising:

sending, by the IC, second instruction information to the processor at intervals of a predetermined period, wherein the second instruction information is used for requesting the processor to adjust the level of the first control signal output to the m groups of inverse controllers to the first level;

wherein the predetermined period comprises x duty cycle periods used for displaying one frame of image, the duty cycle period is a signal period of a second control signal, and the second control signal is used for controlling luminance of the display screen.

17. The method according to claim 16, wherein after sending, by the IC, the second instruction information to the processor at intervals of a predetermined period, the method further comprises:

adjusting, by the processor, the level of the first control signal output to the m groups of inverse controllers to the first level at intervals of a predetermined time duration;

wherein the predetermined time duration is t+T×p, t being used for indicating that a level of the second control signal is the first level and indicating a time duration elapsed when the second control signal moves from a top of the display screen to a first luminance sensor, the m luminance sensors being arranged at intervals from up to down at a lower part of the display screen, T being used for indicating the predetermined period, and p being a positive integer.

18. A non-transitory computer-readable storage medium having stored therein instructions that, when executed by a processor of an apparatus for determining ambient light luminance, cause the apparatus to perform a method for determining ambient light luminance, the method comprising:

outputting, by the processor, a first control signal to m groups of inverse controllers, wherein the first control signal is used for controlling luminance of first pixels in m groups of target pixel rows and the first pixels are arranged above m luminance sensors;

sending, by the processor, first instruction information to the m luminance sensors when a level of the first control signal is a first level, wherein the first instruction information is used for controlling the m luminance sensors to acquire an optical signal transmitting through a display screen, and the first level is used for controlling the first pixels in the m groups of target pixel rows to display as black; and determining, by the m luminance sensors, an ambient light luminance value based on the optical signal.

19. The non-transitory computer-readable storage medium according to claim 18, wherein the instructions stored therein that, when executed by an IC of an apparatus for determining ambient light luminance, cause the apparatus to perform a method for determining ambient light luminance, the method comprising:

sending, by the IC, second instruction information to the processor at intervals of a predetermined period, wherein the second instruction information is used for requesting the processor to adjust the level of the first control signal output to the m groups of inverse controllers to the first level;

wherein the predetermined period comprises x duty cycle periods used for displaying one frame of image, the duty cycle period is a signal period of a second control signal, and the second control signal is used for controlling luminance of the display screen.

20. The non-transitory computer-readable storage medium according to claim 19, wherein after sending, by the IC, the second instruction information to the processor at intervals of a predetermined period, the method further comprises:

adjusting, by the processor, the level of the first control signal output to the m groups of inverse controllers to the first level at intervals of a predetermined time duration;

wherein the predetermined time duration is t+T×p, t being used for indicating that a level of the second control signal is the first level and indicating a time duration elapsed when the second control signal moves from a top of the display screen to a first luminance sensor, the m luminance sensors being arranged at intervals from up to down at a lower part of the display screen, T being used for indicating the predetermined period, and p being a positive integer.

* * * * *